US010356636B2

(12) United States Patent
Guirguis et al.

(10) Patent No.: US 10,356,636 B2
(45) Date of Patent: Jul. 16, 2019

(54) TECHNIQUES AND APPARATUSES TO IMPROVE DRONE-MOUNTED USER EQUIPMENT PERFORMANCE

(71) Applicant: QUALCOMM Incorporated, San Diego, CA (US)

(72) Inventors: Sameh Guirguis, San Diego, CA (US); Kausik Ray Chaudhuri, San Diego, CA (US); Atanu Halder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 15/477,745

(22) Filed: Apr. 3, 2017

(65) Prior Publication Data
US 2018/0288630 A1 Oct. 4, 2018

(51) Int. Cl.
*H04W 24/02* (2009.01)
*H04W 24/10* (2009.01)
(Continued)

(52) U.S. Cl.
CPC .......... *H04W 24/02* (2013.01); *H04W 24/10* (2013.01); *H04W 28/18* (2013.01); *H04W 36/26* (2013.01);
(Continued)

(58) Field of Classification Search
CPC ......... H04L 47/10; H04L 47/30; H04L 47/11; H04L 47/12; H04L 2012/5631;
(Continued)

(56) References Cited

U.S. PATENT DOCUMENTS 8,213,957 B2   7/2012  Bull et al.
8,649,791 B1 *  2/2014  Wohld .............. H04W 36/0083
                                                 455/446
(Continued)

FOREIGN PATENT DOCUMENTS

WO   2013121396 A1   8/2013
WO   2017016488 A1   2/2017

OTHER PUBLICATIONS

International Search Report and Written Opinion—PCT/US2018/018041—ISA/EPO—Apr. 30, 2018.
(Continued)

*Primary Examiner* — Brenda H Pham
(74) *Attorney, Agent, or Firm* — Harrity & Harrity, LLP

(57) ABSTRACT

A method, an apparatus, a base station, user equipment, and a computer program product for wireless communication are provided. In some aspects, the apparatus may identify a user equipment as a drone-mounted user equipment, and/or may configure one or more parameters associated with the user equipment based at least in part on identifying the user equipment as a drone-mounted user equipment. In some aspects, the apparatus may determine, for a user equipment mounted on a drone, that a threshold is satisfied with regard to an uplink throughput, a downlink throughput, a signal strength, or a signal quality associated with the user equipment, and/or may configure a transmission power parameter or a measurement reporting parameter based at least in part on determining that the threshold is satisfied.

29 Claims, 15 Drawing Sheets

(51) Int. Cl.
*H04W 52/36* (2009.01)
*H04W 72/04* (2009.01)
*H04W 36/26* (2009.01)
*H04W 28/18* (2009.01)
*H04W 52/14* (2009.01)
*H04W 52/24* (2009.01)
*H04W 52/28* (2009.01)
*H04B 7/0413* (2017.01)
*H04B 7/06* (2006.01)

(52) U.S. Cl.
CPC ....... *H04W 52/146* (2013.01); *H04W 52/247* (2013.01); *H04W 52/288* (2013.01); *H04W 52/36* (2013.01); *H04W 72/0453* (2013.01); *H04B 7/0413* (2013.01); *H04B 7/0617* (2013.01); *H04W 52/365* (2013.01); *H04W 52/367* (2013.01)

(58) Field of Classification Search
CPC ..... H04L 47/15; H04L 47/2441; H04L 47/70; H04L 12/5602; H04L 47/27; H04L 2012/5635; H04L 2012/5636; H04L 2012/5632; H04L 47/35; H04L 47/32
USPC .......................... 370/229–335, 349, 331, 332
See application file for complete search history.

(56) References Cited

U.S. PATENT DOCUMENTS

| | | |
|---|---|---|
| 9,467,922 B1 | 10/2016 | Buchmueller et al. |
| 9,479,392 B2 | 10/2016 | Anderson et al. |
| 2010/0034114 A1* | 2/2010 | Kim ...................... H04L 1/0026 370/252 |
| 2011/0080825 A1* | 4/2011 | Dimou ................ H04J 11/0086 370/216 |
| 2015/0236778 A1 | 8/2015 | Jalali |
| 2016/0029430 A1 | 1/2016 | Mishra et al. |
| 2016/0330771 A1* | 11/2016 | Tan ....................... H04W 16/14 |
| 2017/0150373 A1* | 5/2017 | Brennan ............... H04W 16/28 |
| 2017/0295069 A1* | 10/2017 | Sweet, III ............ B64C 39/024 |
| 2018/0167236 A1* | 6/2018 | Li ....................... H04L 25/0204 |

OTHER PUBLICATIONS

LG Electronics: "Potential Enhancements to LTE for Aerial Vehicles," 3GPP Draft, R1-1704855, 3rd Generation Partnership Project (3GPP), Mobile Competence Centre, 650, Route Des Lucioles, F-06921, Sophia-Antipolis Cedex, vol. RAN WG1, Spokane, USA, Mar. 25, 2017 (Mar. 25, 2017), XP051251543, pp. 1-3.

NTT Docomo., et al., "Potential Challenges on Emerging Drone Services," 3GPP Draft, R2-1701077, 3rd Generation Partnership Project (3GPP), Mobile Competence Centre, 650, Route Des Lucioles, F-06921 Sophia-Antipolis Cedex, France, vol. RAN WG2, Athens, Greece, Feb. 12, 2017 (Feb. 12, 2017), XP051211808, pp. 1-4.

Softbank: "Issues on the Operations of Drone UEs," 3GPP Draft, R1-1705092_SB_DRONE_R2, 3rd Generation Partnership Project (3GPP), Mobile Competence Centre, 650, Route Des Lucioles, F-06921, Sophia-Antipolis Cedex , France, vol. RAN WG1, Spokane, WA, USA, Apr. 2, 2017 (Apr. 2, 2017), XP051243223, pp. 1-3.

\* cited by examiner

US 10,356,636 B2

1

TECHNIQUES AND APPARATUSES TO IMPROVE DRONE-MOUNTED USER EQUIPMENT PERFORMANCE

BACKGROUND

Field

The present disclosure relates generally to communication systems, and more particularly, to techniques and apparatuses for improving drone-mounted user equipment (UE) performance.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product are provided.

In some aspects, the method may include identifying, by a base station, a user equipment (UE) as a drone-mounted UE; and/or configuring, by the base station, one or more parameters associated with the UE based at least in part on identifying the UE as a drone-mounted UE.

In some aspects, the apparatus may include a memory and at least one processor coupled to the memory and configured to identify a UE as a drone-mounted UE; and/or configure one or more parameters associated with the UE based at least in part on identifying the UE as a drone-mounted UE.

In some aspects, the apparatus may include means for identifying a UE as a drone-mounted UE; and/or means for configuring one or more parameters associated with the UE based at least in part on identifying the UE as a drone-mounted UE.

In some aspects, the method may include determining, by a UE mounted on a drone, that a threshold is satisfied with regard to an uplink throughput, a downlink throughput, a signal strength, or a signal quality associated with the UE; and/or configuring, by the UE, a transmission power or a measurement reporting parameter based at least in part on determining that the threshold is satisfied.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
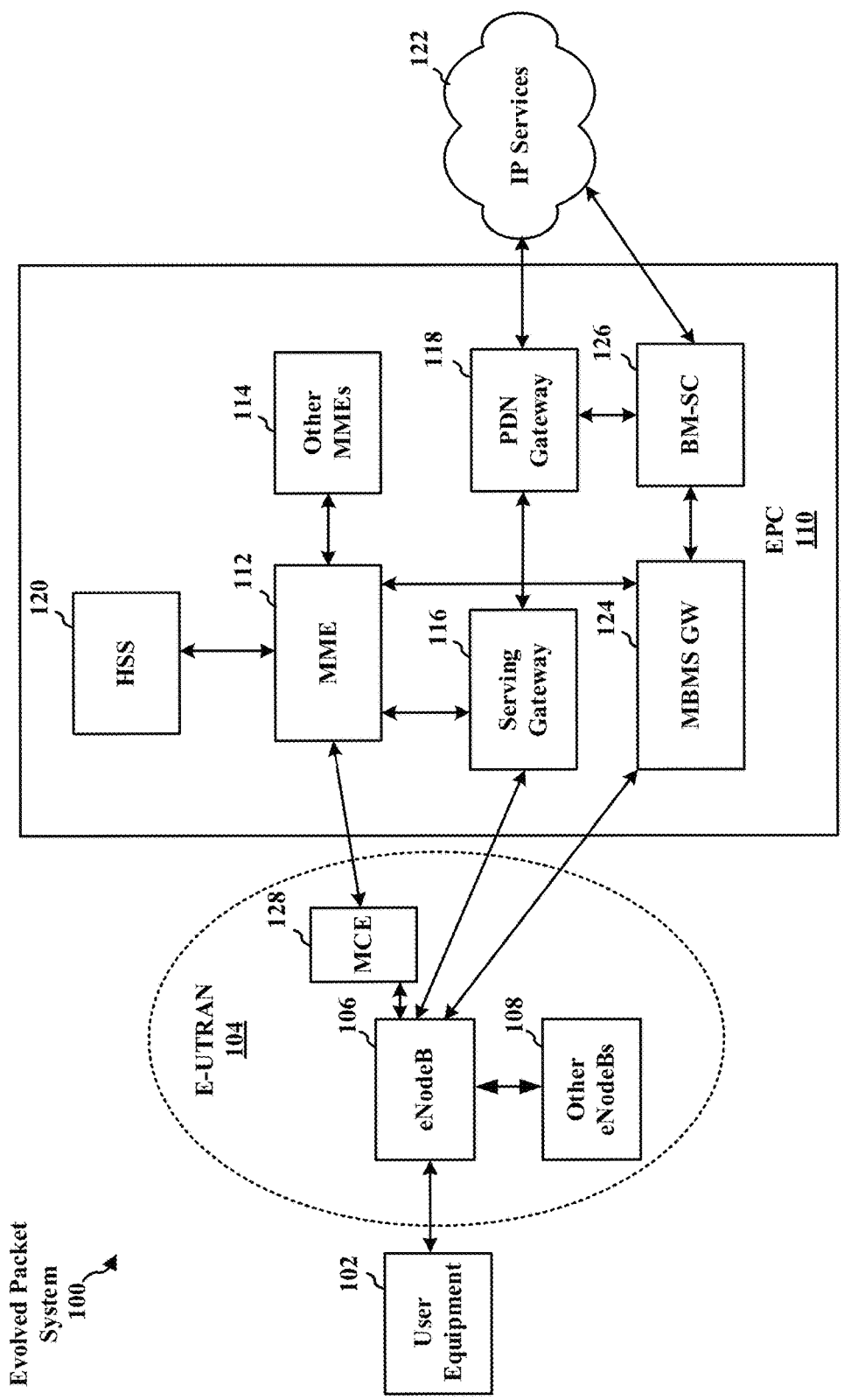
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some aspects, the UE 102 may be mounted to, attached to, or integrated in a drone or unmanned aerial vehicle (UAV). In such a case, the UE 102 may be referred to as a drone-mounted UE, or DMUE.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

FIG. 1 is provided as an example. Other examples are possible and may differ from what was described in connection with FIG. 1.

Figure 2:
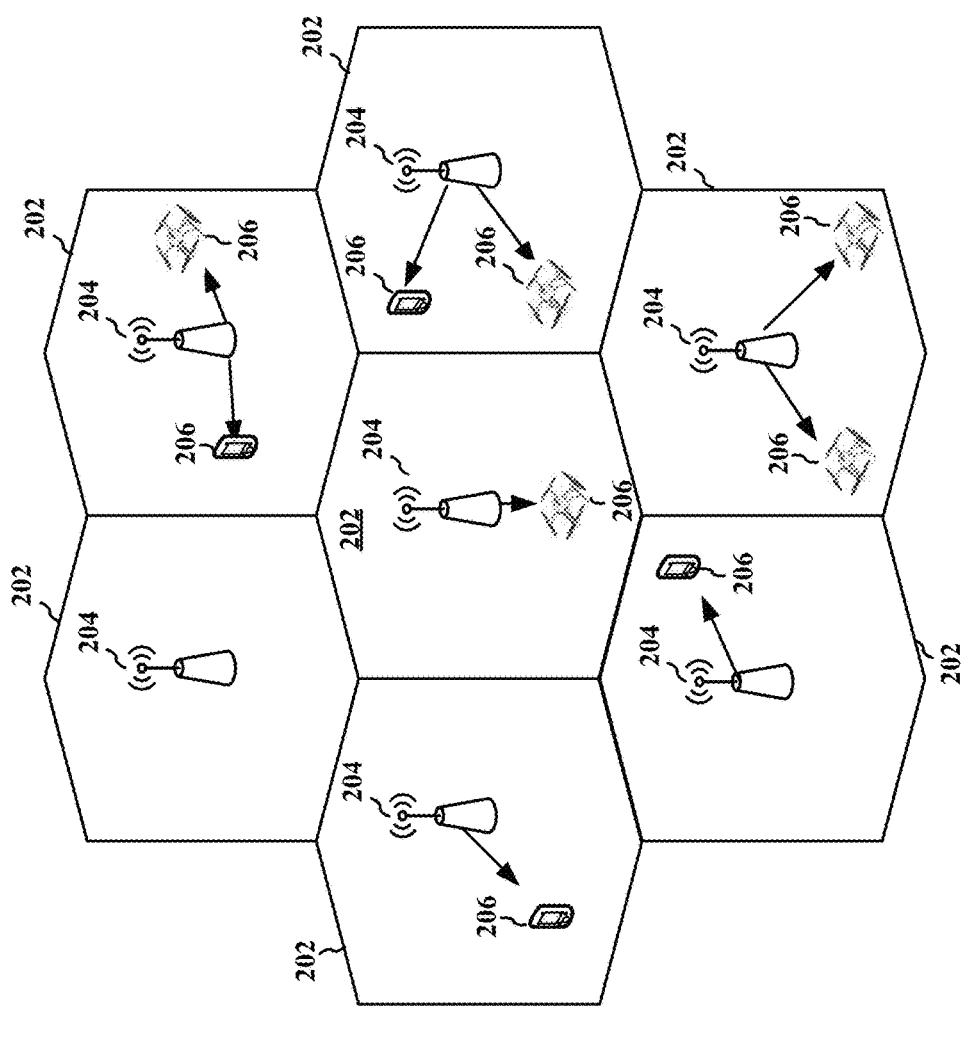
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the Serving Gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

FIG. 2 is provided as an example. Other examples are possible and may differ from what was described in connection with FIG. 2.

Figure 3:
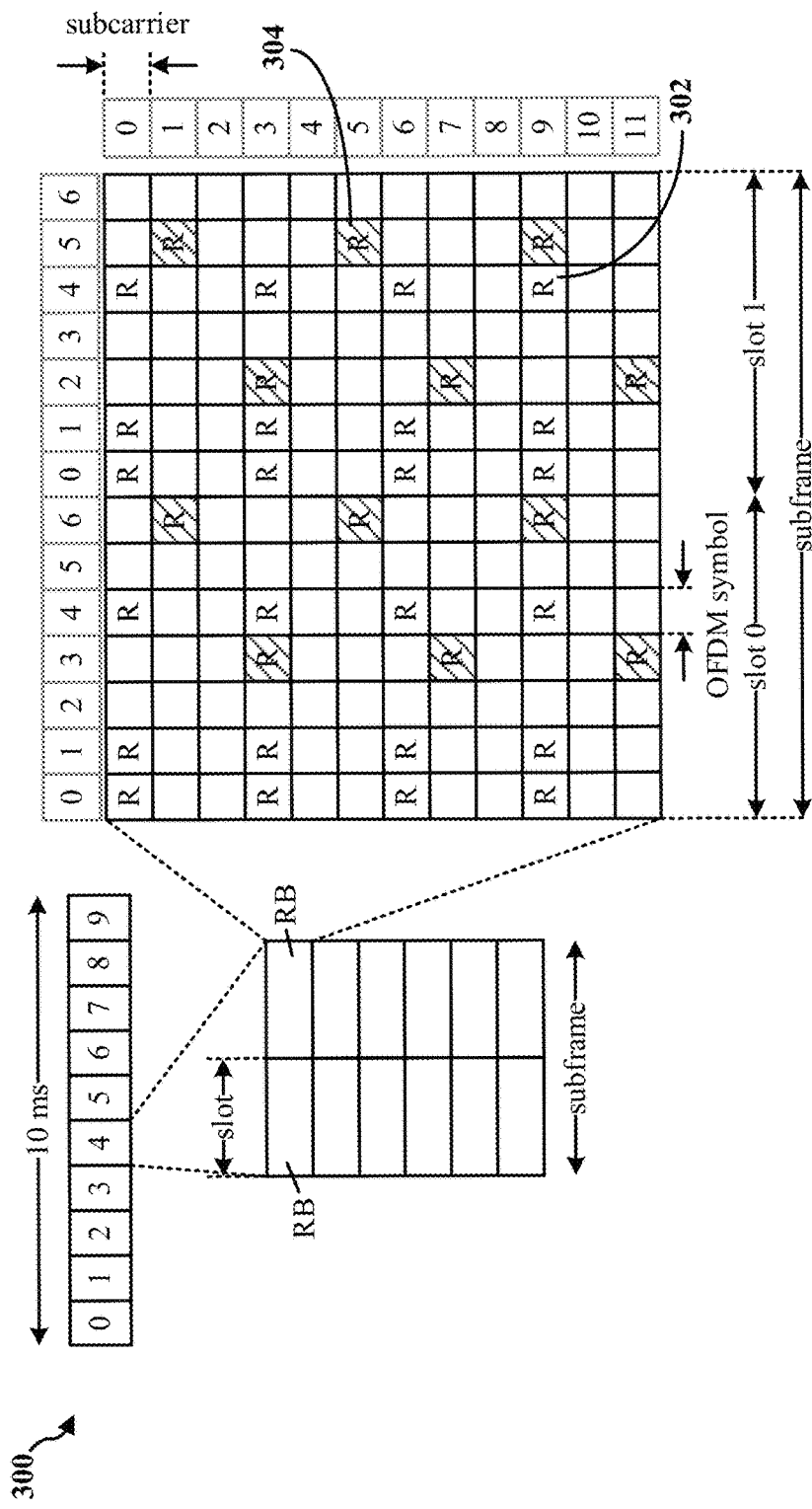
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 3 is provided as an example. Other examples are possible and may differ from what was described in connection with FIG. 3.

Figure 4:
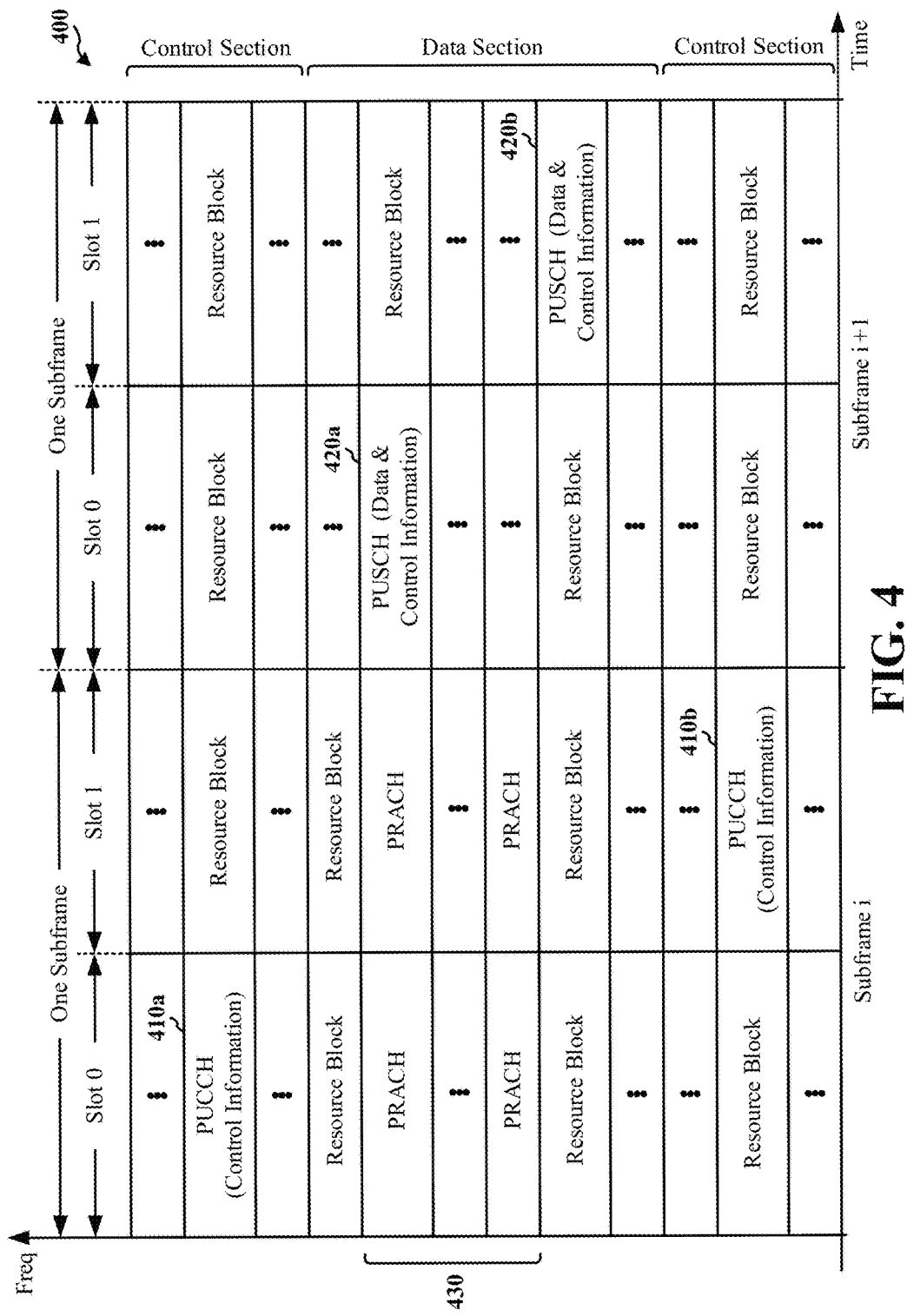
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size.

The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single sub-frame (1 ms) or in a sequence of few contiguous sub-frames and a UE can make a single PRACH attempt per frame (10 ms).

FIG. 4 is provided as an example. Other examples are possible and may differ from what was described in connection with FIG. 4.

Figure 5:
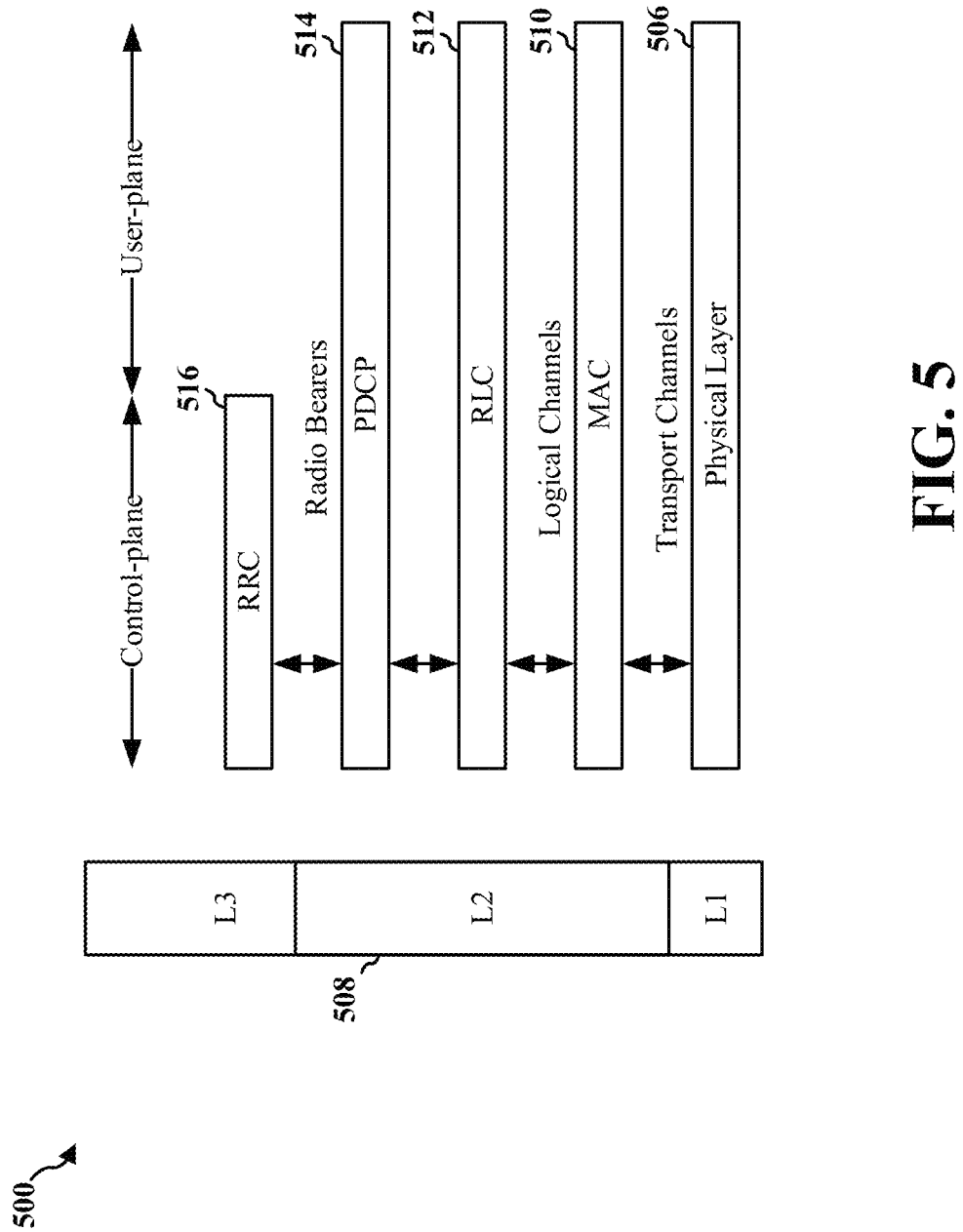
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) sublayer 514, which are terminated at the eNB on the network side. Although not shown, the UE may have several upper layers above the L2 layer 508 including a network layer (e.g., IP layer) that is terminated at the PDN Gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

FIG. 5 is provided as an example. Other examples are possible and may differ from what was described in connection with FIG. 5.

Figure 6:
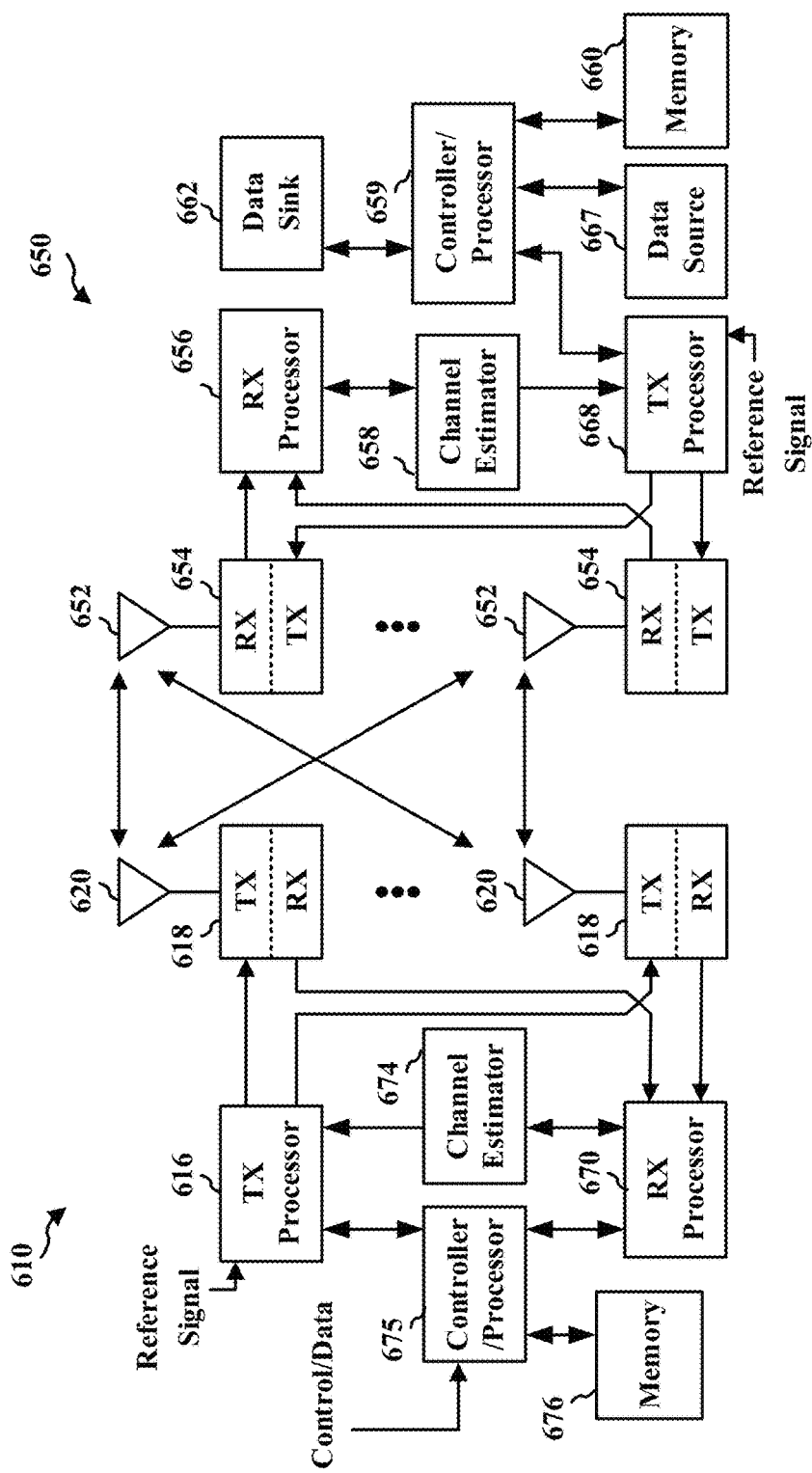
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based at least in part on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based at least in part on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based at least in part on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 6 is provided as an example. Other examples are possible and may differ from what was described in connection with FIG. 6.

A drone (e.g., an unmanned aerial vehicle, or UAV) may be controlled by a UE mounted to, integrated with, and/or connected to the drone. Such a UE may be referred to herein as a drone-mounted UE, or DMUE. A controlling entity (e.g., a user of the drone, an administrator of a system that implements the drone, a control center that manages drone delivery or deployment, and/or the like) may control the drone via the DMUE (e.g., via an LTE network, a 5G network, or a network associated with another radio access technology). Thus, the drone may be controlled over large distances using a cellular network, even when line of sight and/or direct radio contact between the DMUE and the controlling entity are broken. This may enable package delivery, long-range transportation, and other useful services and implementations of drones.

DMUEs may present certain difficulties for a network operator. For example, a cellular network may be configured to provide coverage at ground-level and/or within buildings, and may be configured to compensate for some degree of obstruction of signals by buildings and/or the like (e.g., by transmitting at a high signal strength, by performing interference cancellation on the assumption that some degree of obstruction is present, etc.). A DMUE that is flying above such obstructions may be covered by several different cells. Therefore, some features of the DMUE, which may be configured for coverage by a small number of cells with some degree of obstruction, may not function properly. For example, the DMUE may experience poor RF quality, since no dominant interferer is established when the DMUE is covered by many cells at comparable power levels. As another example, the DMUE may experience a high rate of measurement report transmission and/or a ping-pong handover effect due to being covered by many cells at comparable power levels, which may drain battery of the DMUE. As more examples, a fast-moving DMUE may experience frequent satisfaction of measurement triggers and, therefore, frequent transmission of measurement reports, or a high rate of handover. Still further, the DMUE may cause uplink interference from cells that would otherwise be out of range of the DMUE.

Techniques and apparatuses, described herein, may identify a UE as a DMUE, and may configure the UE to improve performance, reduce battery usage, and reduce interference associated with the DMUE based at least in part on the UE being identified as a DMUE. For example, aspects described herein may limit transmit power of the DMUE, which may reduce interference at cells other than the serving cell of the DMUE. Additionally, or alternatively, aspects described herein may allocate a restricted set of RACH preambles for the DMUE, which may improve RACH performance of the DMUE when the DMUE is moving at a high rate of speed. Additionally, or alternatively, aspects described herein may allocate a particular band, set of resource blocks, and/or set of sub-frames to DMUEs, which may enable interference mitigation techniques to be employed for the DMUEs. Additionally, or alternatively, aspects described herein may reconfigure measurement reporting thresholds of the DMUE, which may reduce redundant measurement reporting by the DMUE. In this way, RF performance of the DMUE and the cellular network is improved, battery usage of the DMUE is reduced, and redundant measurement reporting by the DMUE is reduced relative to not using the techniques and apparatuses described herein.

Figure 7A:
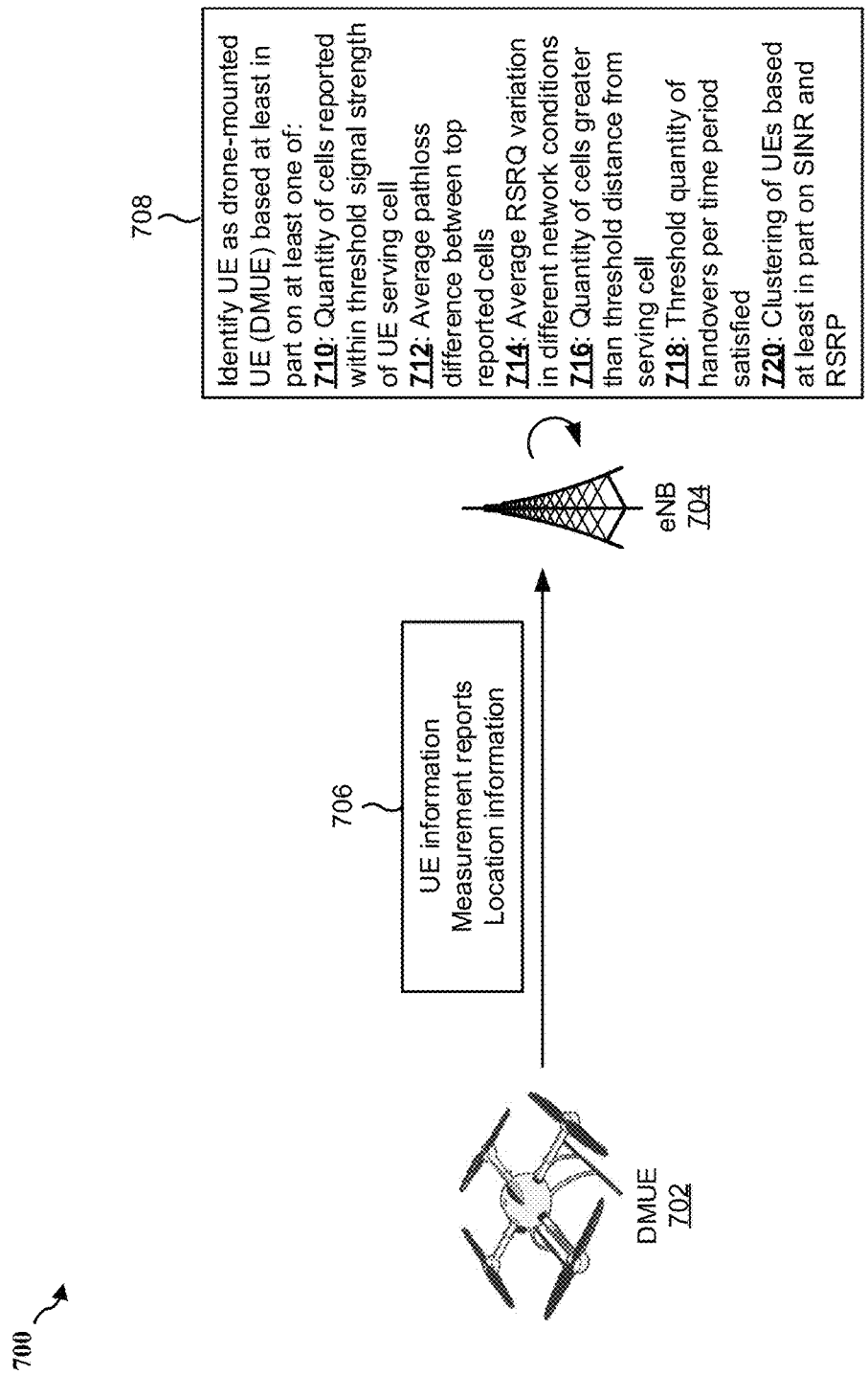
FIGS. 7A and 7B are diagrams of examples of configuring a drone-mounted UE and/or a network to improve performance of the drone-mounted UE and/or the network.
Figure 7B:
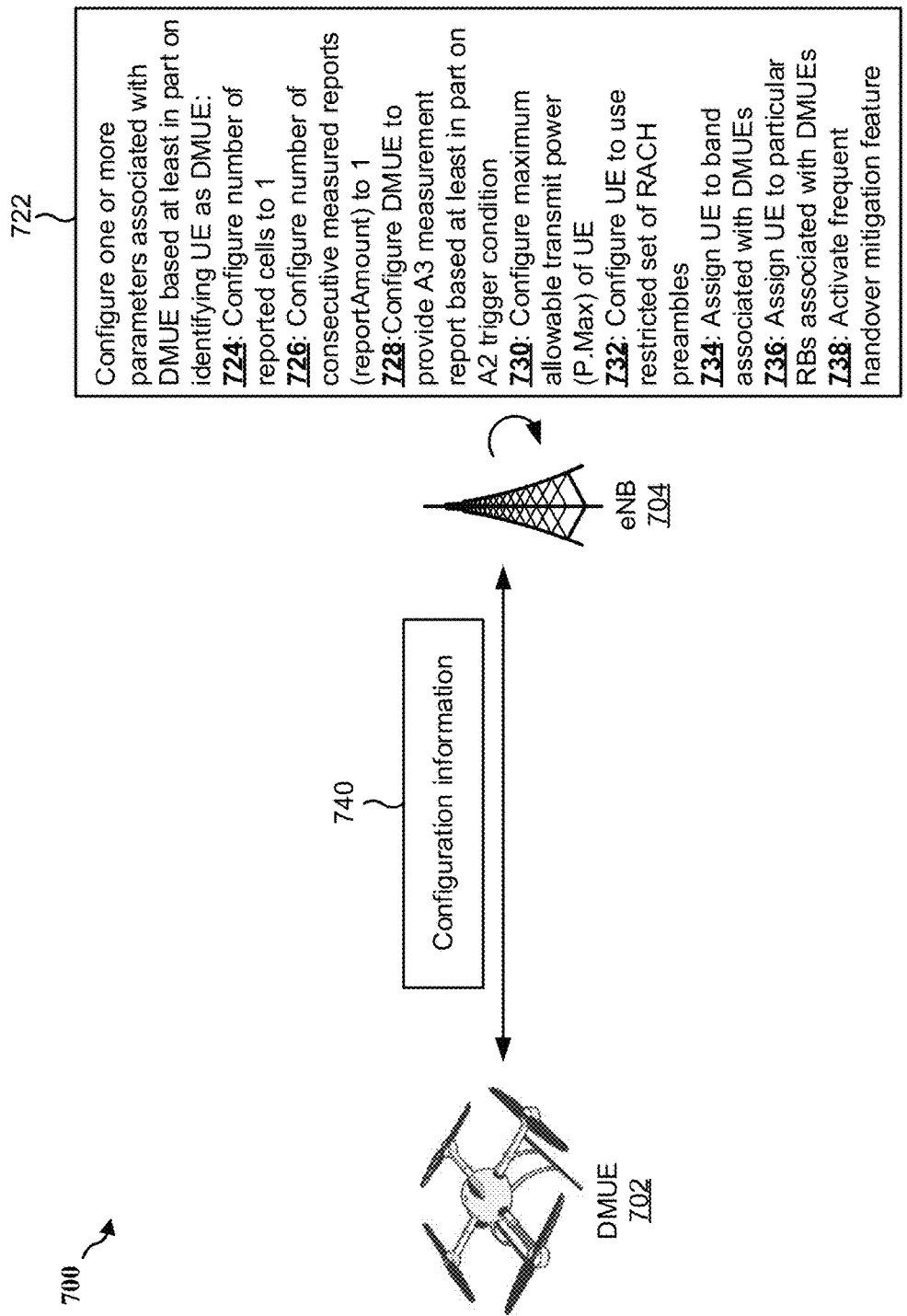

FIGS. 7A and 7B are diagrams of examples 700 of configuring a drone-mounted UE and/or a network to improve performance of the drone-mounted UE and/or the network. As shown, FIG. 7A includes a DMUE 702. DMUE 702 may include a UE (e.g., the UE 102) mounted to a drone. As further shown, FIG. 7A includes an eNB 704. The eNB 704 may include, for example, eNB 106 and/or the like. For the purpose of FIGS. 7A and 7B, assume that eNB 704 provides a serving cell of the DMUE 702.

As shown in FIG. 7A, and by reference number 706, the DMUE 702 may provide UE information to the eNB 704. The UE information may include information to be used by the eNB 704 to identify the DMUE 702 as a DMUE, as described in more detail below. In some aspects, the eNB 704 may receive UE information from other sources, such as other eNBs 704, a self-organizing network (SON) component, and/or the like.

In some aspects, the UE information may include measurement reports. For example, the UE information may identify a quantity of cells reported within a threshold power level of a serving cell of DMUE 702. Additionally, or alternatively, the UE information may identify a pathloss of one or more cells that cover DMUE 702. Additionally, or alternatively, the UE information may identify a signal quality variation based at least in part on network conditions (e.g., a reference signal received quality (RSRQ) metric and/or the like). In some aspects, the UE information may identify locations of cells that cover the DMUE 702 (e.g., of eNBs 704 that provide the cells). In some aspects, the UE information may identify a quantity of handovers per unit time. In some aspects, the UE information may identify a signal to interference plus noise ratio (SINR) of one or more DMUEs 702.

As shown in FIG. 7A, and by reference number 708, the eNB 704 may identify the UE associated with DMUE 704 as a DMUE based at least in part on one or more parameters. Examples of the parameters are shown by reference numbers 710 through 720, and are described in turn below.

As shown by reference number 710, in some aspects, the eNB 704 may identify the DMUE 702 based at least in part on a quantity of cells reported with a threshold signal strength of a serving cell of the DMUE 702. For example, when a threshold quantity of cells (e.g., 3 cells, 5 cells, and/or the like) are within a threshold signal strength (e.g., within 2 dBm, 3 dBm, 5 dBm, and/or the like) of a serving cell of the DMUE 702, it may be assumed that the DMUE 702 is located above obstructions between the cells and the serving cell. Therefore, the eNB 704 may determine that the DMUE 702 is a DMUE when the threshold quantity of cells is within the threshold signal strength of the serving cell of the DMUE 702 (e.g., at a particular time, over a particular length of time, and/or the like). In some aspects, the eNB 704 may determine the signal strength of the other cells based at least in part on a measurement report received from the UE 702 that identifies the signal strength of the other cells.

As shown by reference number 712, in some aspects, the eNB 704 may identify the DMUE 702 based at least in part on an average pathloss difference between a set of the top reported cells. A pathloss is a reduction in power density of a cellular signal as the cellular signal propagates through space. Pathloss may be caused by interferers or obstructions in the path of the cellular signal. The DMUE 702 may report pathloss values for a set of top reported cells (e.g., cells associated with highest signal strengths). The eNB 704 may identify the DMUE 702 as a DMUE 702 when an average pathloss difference between a set of top reported cells is less than a threshold, such as 3 dB, 5 dB, and/or the like. When the average pathloss difference is less than the threshold, it may be inferred that DMUE 702 is operating above obstructions that may cause differing pathloss values between the set of top cells. Therefore, the eNB 704 may determine that the DMUE 702 is a DMUE when the average pathloss difference between the set of top reported cells is lower than the threshold.

As shown by reference number 714, in some aspects, the eNB 704 may identify the DMUE 702 based at least in part on an average reference signal received quality (RSRQ) variation in different network conditions. The different network conditions may include, for example, a lightly-loaded network condition, a moderately-loaded network condition, a heavily-loaded network condition, and/or the like. A DMUE 702 may experience less RSRQ variation than a UE 102 at ground level in different network conditions. Therefore, the eNB 704 may identify the DMUE 702 as a DMUE based at least in part on an RSRQ variance in different network conditions of the DMUE 702 being less than a threshold (e.g., less than 1 dB, 2 dB, 5 dB, and/or the like). The DMUE 702 may provide information identifying the RSRQ values as part of measurement reports of the DMUE 702.

As shown by reference number 716, in some aspects, the eNB 704 may identify the DMUE 702 based at least in part on a quantity of cells that are greater than a threshold distance from a serving cell of the DMUE 702. For example, the eNB 704 may receive information identifying locations of cells that cover the DMUE 702. When the DMUE 702 is covered by a threshold quantity of cells (e.g., 1 cell, 3 cells, and/or the like) that are greater than a threshold distance (e.g., 1 kilometer, 3 kilometers, 5 kilometers, and/or the like) from a serving cell of the DMUE 702, it may be inferred that the DMUE 702 is at an altitude above obstructions that would otherwise obstruct signals of the threshold quantity of cells. Therefore, the eNB 704 may determine that the DMUE 702 is a DMUE when the eNB 704 determines that the DMUE 702 is covered by a threshold quantity of cells that are a threshold distance from a serving cell of the DMUE 702.

As shown by reference number 718, in some aspects, the eNB 704 may identify the DMUE 702 based at least in part on the DMUE 702 being associated with a threshold quantity of handovers in a particular time period. For example, a handover may be initiated when the DMUE 702 identifies a neighbor cell with a better signal strength than a serving cell of the DMUE 702. When the DMUE 702 is covered by many neighbor cells due to a lack of obstructions, the DMUE 702 may experience frequent handover. Additionally, or alternatively, a DMUE 702 may experience frequent handover when a drone to which the DMUE 702 is mounted moves at high velocity through many cells. The eNB 704 may identify the DMUE 702 as a DMUE based at least in part on the DMUE 702 being associated with a threshold quantity of handovers (e.g., 3 handovers, 5 handovers, and/or the like) in a particular time period (e.g., 1 minute, 5 minutes, and/or the like).

As shown by reference number 720, in some aspects, the eNB 704 may identify the DMUE 702 based at least in part on clustering of UEs according to signal to interference plus noise (SINR) and received signal reference power (RSRP) metrics of the UEs. For example, the eNB 704 may identify a set of UEs with similar RSRP metrics. When the set of UEs includes a subset of UEs that have SINR values that are similar to each other and lower than SINR values of the set of UEs by a threshold amount (e.g., 3 dB, 5 dB, or another value), the eNB 704 may identify the subset of UEs as DMUEs 702.

In some aspects, the eNB 704 may determine that the DMUE 702 is a DMUE based at least in part on a combination of the above parameters. For example, the eNB 704 may assign respective score(s) for one or more of the above parameters, and may determine whether a UE is a DMUE based at least in part on combining the respective score(s). Additionally, or alternatively, the respective scores may be determined based at least in part on respective weights, such that one or more of the above parameters may be weighted to be more important or less important than another of the above parameters. In this way, the eNB 704 identifies a UE as a DMUE based at least in part on network performance metrics and cell locations associated with the UE, which saves time, network resources, and configuration resources that would otherwise be used to configure the DMUE 702 to identify itself as a DMUE (e.g., based at least in part on a signal indicating that the DMUE 702 is a DMUE, and/or the like).

As shown in FIG. 7B, the eNB 704 may configure one or more parameters associated with DMUE 702 based at least in part on identifying the UE as a DMUE 702. Examples of the parameters are shown by reference numbers 724 through 738, and are described in turn below. In some aspects, the eNB 704 may configure a single one of the parameters with regard to the DMUE 702. In some aspects, the eNB 704 may configure multiple, different parameters, of the parameters listed below, with regard to the DMUE 702. By configuring one or more of the parameters, the eNB 704 may improve performance and reduce battery consumption of the DMUE 702, and/or may improve network performance of the eNB 704 and/or other network elements associated with a cellular network that covers the DMUE 702 relative to not configuring one or more of the parameters.

As shown by reference number 724, in some aspects, the eNB 704 may configure the DMUE 702 to report a single reported cell as part of a measurement report provided by the DMUE 702. For example, the DMUE 702 may transmit a measurement report when a measurement trigger is satisfied. The measurement trigger may be based at least in part on an order of the n strongest cells that cover the DMUE 702 changing. In other words, when a second-strongest cell that covers the DMUE 702 becomes a strongest cell that covers the DMUE 702, or when a third-strongest cell that covers the DMUE 702 becomes a second-strongest cell, the DMUE 702 may collect measurement information for the cells covering the DMUE 702, and may report the measurement information to the eNB 704. When the order of strongest cells changes frequently, as may be expected for DMUE 702, the DMUE 702 may transmit measurement reports frequently. By limiting n to 1, thus causing DMUE 702 to transmit measurement reports only when a strongest cell covering DMUE 702 changes, battery and processor resources of DMUE 702 are conserved, and network congestion is reduced relative to not limiting the transmission of measurement reports by DMUE 702.

As shown by reference number 726, in some aspects, the eNB 704 may configure a quantity of consecutive measurement reports to a particular value (e.g., 1, 3, and/or the like). For example, when a measurement trigger of the DMUE 702 is satisfied, the DMUE 702 may determine to transmit a quantity m of measurement reports over a particular length of time. Therefore, when the measurement trigger is frequently satisfied, as may be expected for DMUE 702, the DMUE 702 may frequently transmit m measurement reports, which may use resources and battery power of the DMUE 702 and congest the cellular network. By reducing the quantity m to a value such as 1, 2, and/or the like, the eNB 704 may conserve resources that would otherwise be used to transmit repetitive measurement reports when a measurement trigger of the DMUE 702 are frequently triggered.

As shown by reference number 728, in some aspects, the eNB 704 may configure the DMUE 702 to provide an A3 measurement report based at least in part on an A2 trigger condition. For example, an A2 measurement report may be triggered when a serving cell power and/or quality becomes worse than a threshold. An A3 measurement report may be triggered when a neighbor cell power and/or quality becomes better than a primary cell power and/or quality by a particular offset. Furthermore, the A3 measurement report may trigger handover from the primary cell to the neighbor cell. Therefore, the A3 measurement report may be frequently triggered, and handover may be frequently caused, due to the DMUE 702 being associated with many cells at similar power and/or quality levels. By configuring the A3 measurement report to be triggered based at least in part on the A2 trigger condition, the eNB 704 reduces handover and extraneous reporting of the DMUE 702, which conserves network resources and DMUE 702 resources, and which conserves network resources that would otherwise be used to handle frequent handover of the DMUE 702.

As shown by reference number 730, in some aspects, the eNB 704 may configure a maximum allowable transmit power of the DMUE 702. For example, signals transmitted by the DMUE 702 may not encounter interference due to obstructions, which may lead to interference at other eNBs 704. By decreasing the maximum allowable transmit power of the DMUE 702, the eNB 704 reduces interference at the other eNBs 704 due to the signals transmitted by the DMUE 702. For example, different classes of UE may be associated with different maximum allowable transmit power, which may be denoted using a variable p.max. An eNB 704 may specify a value of p.max based at least in part on a band associated with a UE, channel conditions, and/or the like. In this case, the eNB 704 may specify a value of p.max to decrease a maximum allowable transmit power of the DMUE 702. Thus, interference at other eNBs 704 originating from the DMUE 702 is reduced. This may be advantageous in situations where many DMUEs 702 are located in a particular area. By reducing maximum allowable transmit powers of the many DMUEs 702, a cumulative effect of interference by the many DMUEs 702 is mitigated relative to not reducing the maximum allowable transmit powers.

As shown by reference number 732, in some aspects, the eNB 704 may configure the DMUE 702 to use a restricted set of random access channel (RACH) process preambles. The DMUE 702 may establish uplink synchronization with the eNB 704 using the RACH process. To establish the uplink synchronization, the DMUE 702 may encode particular information into a RACH preamble to be transmitted at a start of the RACH process. In some aspects, the DMUE 702 may use an unrestricted set of RACH preambles, but such an approach may reduce efficiency of the RACH process when the DMUE 702 is moving at high speed. By configuring the DMUE 702 to use a restricted set of RACH preambles, the eNB 704 may improve RACH synchronization performance of the DMUE 702, which, in turn, improves network and UE performance of the DMUE 702.

As shown by reference number 734, in some aspects, the eNB 704 may assign the DMUE 702 to one or more bands associated with DMUEs. For example, the eNB 704 may allocate network resources for UEs that are to communicate via the eNB 704. The eNB 704 may allocate one or more bands to be used by DMUEs, including DMUE 702. By allocating the one or more bands, the eNB 704 may isolate the DMUEs from bands associated with other UEs, which may reduce interference caused by the DMUEs.

As shown by reference number 736, in some aspects, the eNB 704 may schedule one or more RBs, associated with DMUEs, for the DMUE 702. For example, the eNB 704 may schedule a particular range of RBs for DMUEs, which may reduce uplink interference on other bands and/or other RBs within a band. Additionally, or alternatively, the eNB 704 may schedule one or more sub-frames for DMUEs, and may schedule communications for the DMUE 702 in the one or more sub-frames. This may also reduce uplink interference on other bands and/or other sub-frames associated with other UEs.

As shown by reference number 738, in some aspects, the eNB 704 may activate a frequent handover mitigation feature with regard to the DMUE 702. For example, the eNB 704 (or a SON system associated with the eNB 704) may have one or more features to reduce frequency of handover of UEs (e.g., UEs associated with high speed flags, DMUEs, and/or the like). For example, the one or more features may include a feature to disallow a second handover within a particular length of time of a first handover, a feature to increase an offset of measurement values before handover is triggered, and/or the like. By activating the one or more frequent handover features, the eNB 704 may reduce network congestion and loading due to handover of DMUEs 702.

In some aspects, the eNB 704 may configure a single one of the above-identified parameters. In some aspects, the eNB 704 may configure a plurality of the above-identified parameters. The above-identified parameters are examples of possible parameters that may be configured.

In some aspects, the eNB 704 may configure the one or more parameters based at least in part on a measurement or condition associated with the DMUE 702 and/or a network including the eNB 704. For example, the eNB 704 may configure the DMUE 702 to reduce a quantity of reported cells and/or a quantity of consecutive measurement reports based at least in part on the eNB 704 determining that the DMUE 702 has transmitted a threshold quantity of measurement reports in a particular amount of time. Additionally, or alternatively, the eNB 704 may configure the DMUE 702 to provide an A3 measurement report based at least in part on an A2 measurement trigger based at least in part on the eNB 704 determining that the DMUE 702 has transmitted a threshold quantity of A3 measurement reports in a threshold amount of time. Additionally, or alternatively, the eNB 704 may configure the DMUE 702 to use the restricted set of RACH preambles and/or to activate the frequent handover mitigation feature based at least in part on the eNB 704 determining that the DMUE 702 is moving at a threshold speed. Additionally, or alternatively, the eNB 704 may configure a maximum allowable transmit power, a particular band for DMUEs, a particular set of RBs for DMUEs, and/or a particular set of sub-frames for DMUEs based at least in part on determining that DMUE 702 and/or other DMUEs are causing interference at other eNBs and/or other bands. In this way, effectiveness of configuration of the parameters may be improved by configuring parameters that are relevant to a detected condition associated with the DMUE 702.

FIGS. 7A and 7B are provided as examples. Other examples are possible and may differ from what was described in connection with FIGS. 7A and 7B.

Figure 8:
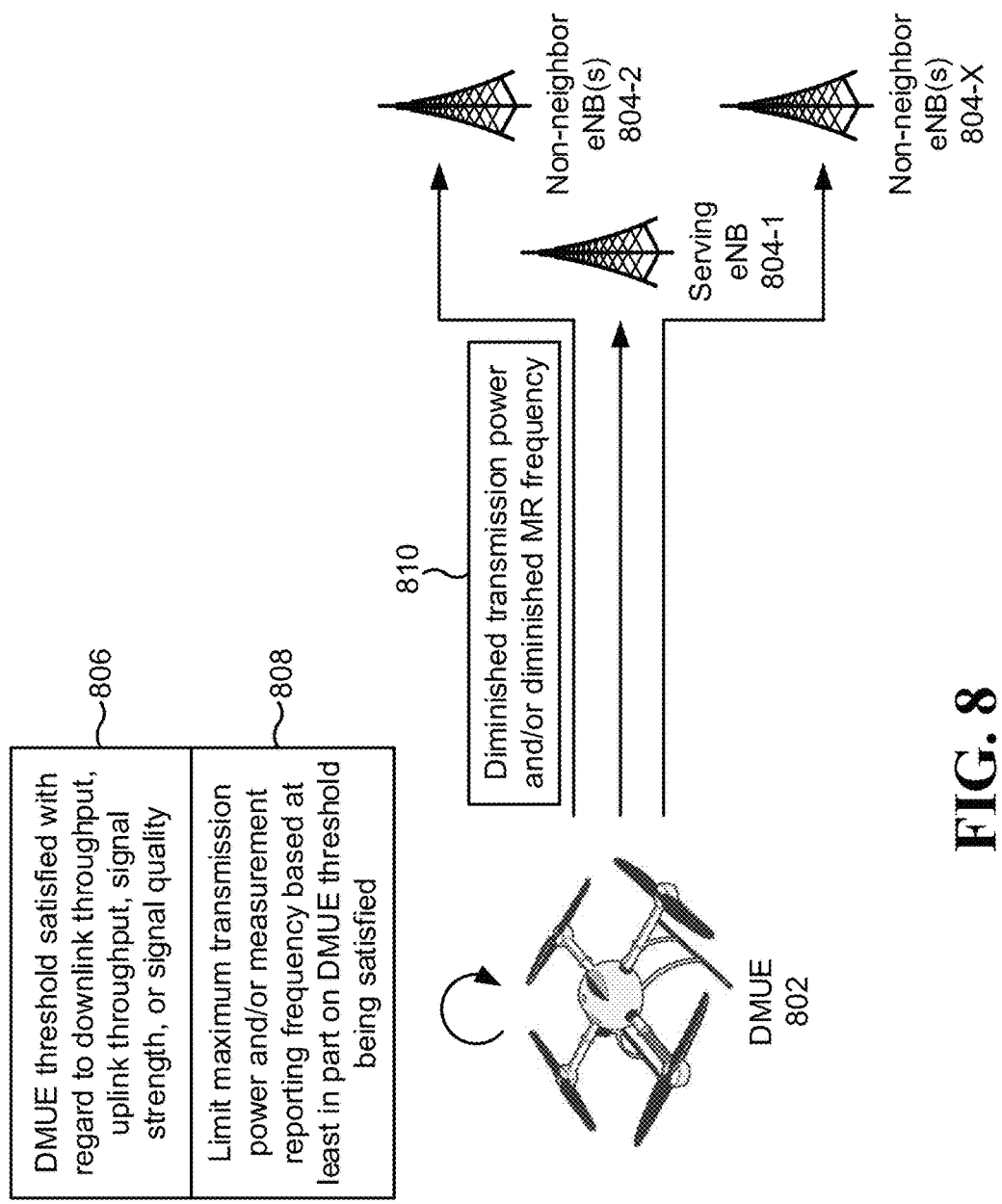
FIG. 8 is a diagram of an example of configuring a drone-mounted UE and/or a network to improve performance of the drone-mounted UE and/or the network.

FIG. 8 is a diagram of an example 800 of configuring a drone-mounted UE and/or a network to improve performance of the drone-mounted UE and/or the network. As shown, FIG. 8 includes a DMUE 802, which may include a UE 102 mounted to a drone. Additionally, or alternatively, the DMUE 802 may include DMUE 702, apparatus 1302/1302', and/or the like. Furthermore, FIG. 8 includes serving eNB 804-1 and non-neighbor eNBs 804-2 through 804-N. Serving eNB 804-1 and non-neighbor eNBs 804-2 through 804-X may include eNB 106, other eNBs 108, and/or the like. For example, serving eNB 804-1 may provide a serving cell of the DMUE 802, and non-neighbor eNBs 804-2 through 804-X may provide other cells that may not be neighbor cells of the serving cell. The non-neighbor eNBs 804 may be negatively impacted by interference or signals transmitted by the DMUE 802. For example, since the DMUE 802 may be located above obstructions, signals from the DMUE 802 may reach farther than intended. This, in turn, may create interference at the non-neighbor eNBs 804.

As shown in FIG. 8, and by reference number 806, the DMUE 802 may determine that a DMUE threshold is satisfied with regard to downlink throughput, uplink throughput, signal strength, or signal quality. The DMUE threshold may be configured so that the DMUE threshold is likely to be satisfied when the DMUE 802 is located above obstructions of the cellular network. For example, the downlink throughput, uplink throughput, signal strength, or signal quality thresholds may include values that are higher than average values for the DMUE 802.

As shown by reference number 808, the DMUE 802 may limit a maximum allowable transmission power and/or a measurement reporting frequency based at least in part on the DMUE threshold being satisfied. In some aspects, the DMUE 802 may limit a maximum allowable transmission power. For example, when the DMUE 802 determines that the DMUE threshold is satisfied with regard to downlink throughput or uplink throughput, the DMUE 802 may report a reduced power headroom value. The reduced power headroom value may cause the serving eNB 804-1 to allocate a reduced maximum allowable transmission power for the DMUE 802. By reducing the maximum allowable transmission power, the DMUE 802 may reduce interference at non-neighbor eNBs 804.

In some aspects, the DMUE 802 may reduce a measurement reporting frequency. For example, as described above, a lack of obstructions around the DMUE 802 may cause the DMUE 802 to frequently transmit measurement reports, since the DMUE 802 is covered by many, different cells with similar signal strength or signal quality values. The DMUE 802 may reduce a measurement reporting frequency based at least in part on determining that the DMUE threshold is satisfied with regard to signal strength and/or signal quality. For example, the DMUE 802 may reduce a quantity of cells identified in a measurement report and/or may reduce a quantity of consecutive measurement reports. In this way, the DMUE 802 may reduce unnecessary measurement reporting, which reduces interference and load on the cellular network. Further, this may conserve processor and battery resources of the DMUE 802.

As shown by reference number 810, the DMUE 802 may transmit signals at a diminished transmission power and/or a diminished measurement reporting (MR) frequency. In this way, the DMUE 802 reduces interference and loading at non-neighbor eNBs 804, which may be particularly beneficial when an area includes many DMUEs 802.

FIG. 8 is provided as an example. Other examples are possible and may differ from what was described in connection with FIG. 8.

Figure 9:
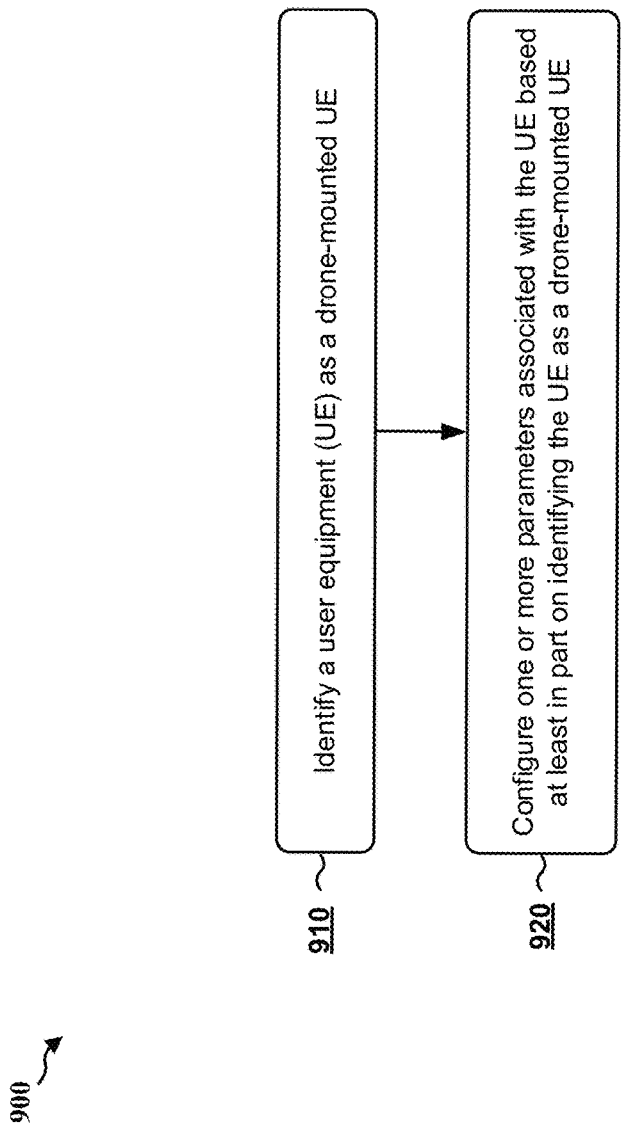
FIG. 9 is a flow chart of a method of wireless communication.

FIG. 9 is a flow chart 900 of a method of wireless communication. The method may be performed by a base station (e.g., the eNB 106, the eNB 704, the eNB 804, the apparatus 1102/1102', and/or the like).

At 910, the base station may identify a user equipment (UE) as a drone-mounted UE. For example, the base station may identify a DMUE as a DMUE based at least in part on measurement reporting of the DMUE, UE information associated with the DMUE, and/or information provided by other base stations regarding the DMUE, as described in more detail in connection with FIG. 7A.

At 920, the base station may configure one or more parameters associated with the UE based at least in part on identifying the UE as a drone-mounted UE. For example, the base station may configure one or more parameters associated with the DMUE, or may cause the DMUE or another device to configure the one or more parameters, as described in more detail in connection with FIG. 7B.

In some aspects, configuring the one or more parameters associated with the DMUE may include configuring the DMUE to report a single cell measurement as part of a set of measurement reports of the DMUE. In some aspects, configuring the one or more parameters associated with the DMUE may include configuring the DMUE to provide a single measurement report based at least in part on a measurement trigger. In some aspects, configuring the one or more parameters associated with the DMUE may include configuring the DMUE to provide an A3 measurement report based at least in part on a measurement trigger associated with an A2 measurement report.

In some aspects, configuring the one or more parameters associated with the DMUE may include configuring the DMUE to limit a transmission power of the DMUE based at least in part on a power headroom or maximum transmission power of the DMUE.

In some aspects, configuring the one or more parameters associated with the DMUE may include configuring the DMUE to use a restricted set of RACH preambles. In some aspects, configuring the one or more parameters associated with the DMUE may include assigning the DMUE to a particular band based at least in part on the DMUE being identified as a DMUE. In some aspects, configuring the one or more parameters associated with the DMUE may include assigning one or more of a particular range of resource blocks or a particular range of sub-frames to the UE based at least in part on the UE being identified as a drone-mounted UE. In some aspects, configuring the one or more parameters associated with the DMUE may include configuring a frequent handover mitigation parameter to reduce handover of the DMUE.

In some aspects, the DMUE may be identified as a DMUE based at least in part on one or more of a threshold quantity of cells being identified as within a threshold signal strength of a serving cell of the UE, a path loss variation value of a set of cells satisfying a threshold, a path loss variation value of a set of cells satisfying a threshold, a signal quality variation value of a set of cells satisfying a threshold, one or more cells being identified as located within a threshold distance from a serving cell of the UE, a threshold quantity of handovers being performed in a particular length of time, or the UE being identified as included in a set of drone-mounted UEs based at least in part on a signal to interference and noise ratio and a signal strength of the set of drone-mounted UEs.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
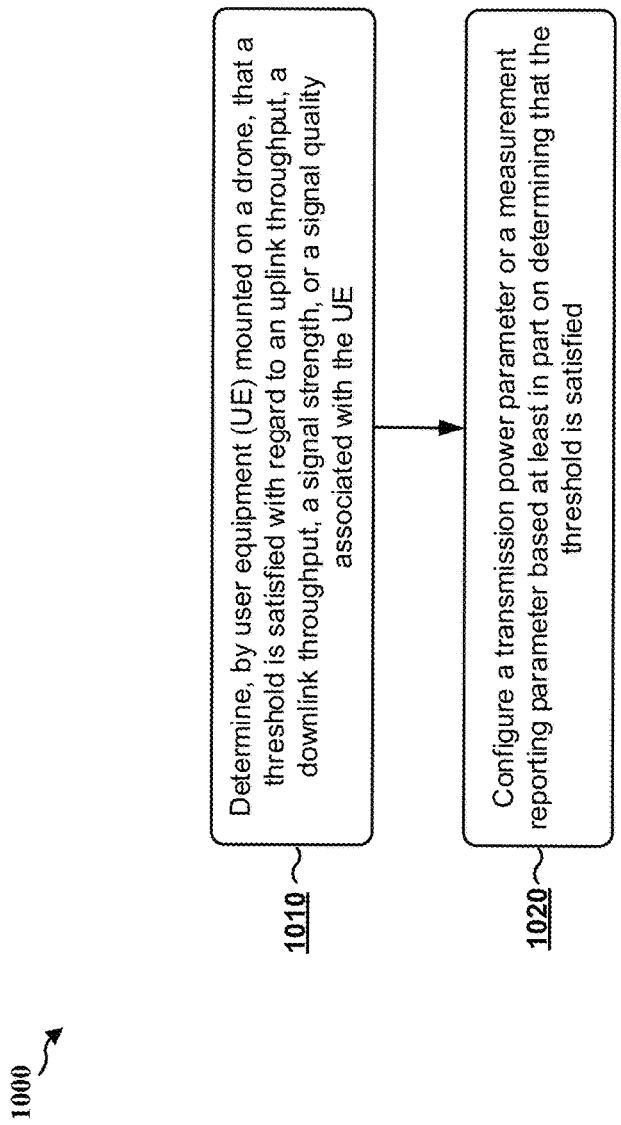
FIG. 10 is another flow chart of a method of wireless communication.

FIG. 10 is a flow chart of a method 1000 of wireless communication. The method 1000 may be performed, for example, by a UE (e.g., the UE 102, the apparatus 1302/1302', and/or the like).

At 1010, the UE, which is mounted on a drone, may determine that a threshold is satisfied with regard to an uplink throughput, a downlink throughput, a signal strength, or a signal quality associated with the UE, as is described in more detail in connection with FIG. 8, above.

At 1020, the UE may configure a transmission power parameter or a measurement reporting parameter based at least in part on determining that the threshold is satisfied. In some aspects, the UE may cause another device to configure the transmission power parameter and/or the measurement reporting parameter, as is also described in more detail in connection with FIG. 8, above.

In some aspects, configuring the transmission power parameter or the measurement reporting parameter may include configuring a maximum transmission power of the UE to less than a maximum allowable transmit power of the UE. In some aspects, configuring the transmission power parameter or the measurement reporting parameter may include configuring a measurement report to be provided by the UE only when the signal strength or the signal quality satisfies the threshold.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
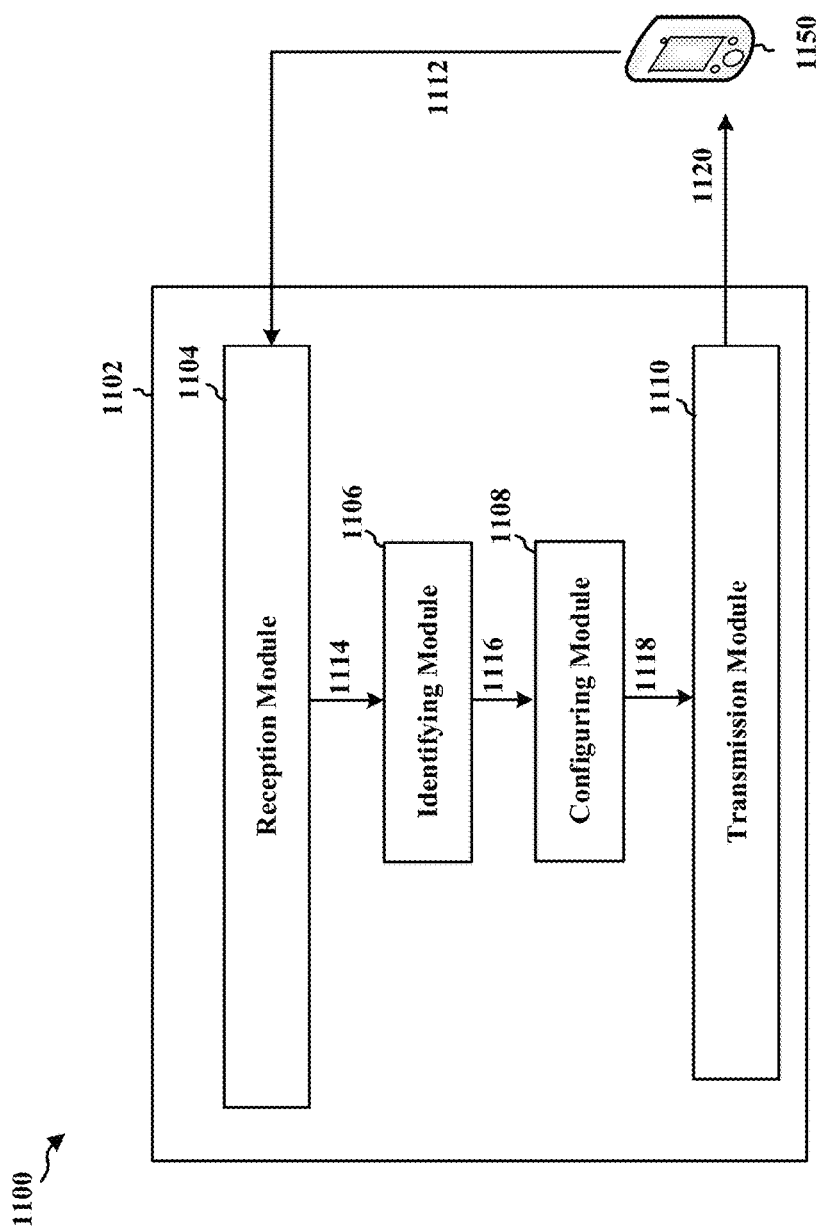
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be an eNB (e.g., the eNB 106, 704, 804, and/or the like). In some aspects, the apparatus 1102 includes a reception module 1104, an identifying module 1106, a configuring module 1108, and/or a transmission module 1110.

The reception module 1104 may receive signals 1112 from a UE 1150 (e.g., a UE 102, 702, 802, 1302/1302', and/or the like). The signals 1112 may include uplink traffic, reference signals, measurement reports, and/or the like. The reception module 1104 may process the signals 1112, and may provide data 1114 to the identifying module 1106 based at least in part on the signals 1112. The data 1114 may identify measurement information, uplink communications, and/or the like.

The identifying module 1106 may identify the UE 1150 as a DMUE based at least in part on the data 1114. The identifying module 1106 may provide data 1116 to the configuring module 1108. The data 1116 may indicate that the UE 1150 is a DMUE, and/or may include part of or all of the information identified by data 1114.

The configuring module 1108 may configure one or more parameters associated with the UE 1150 based at least in part on the data 1116. For example, the configuring module 1108 may configure one or more components of the apparatus 1102 or another base station (e.g., the reception module 1104, transmission module 1110, and/or the like). Additionally, or alternatively, the configuring module 1108 may cause one or more components of the UE 1150 to be configured. The configuring module 1108 may provide data 1118 to the transmission module 1110 to cause the UE 1150 to be configured. The transmission module 1110 may transmit the data 1118 as signals 1120.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
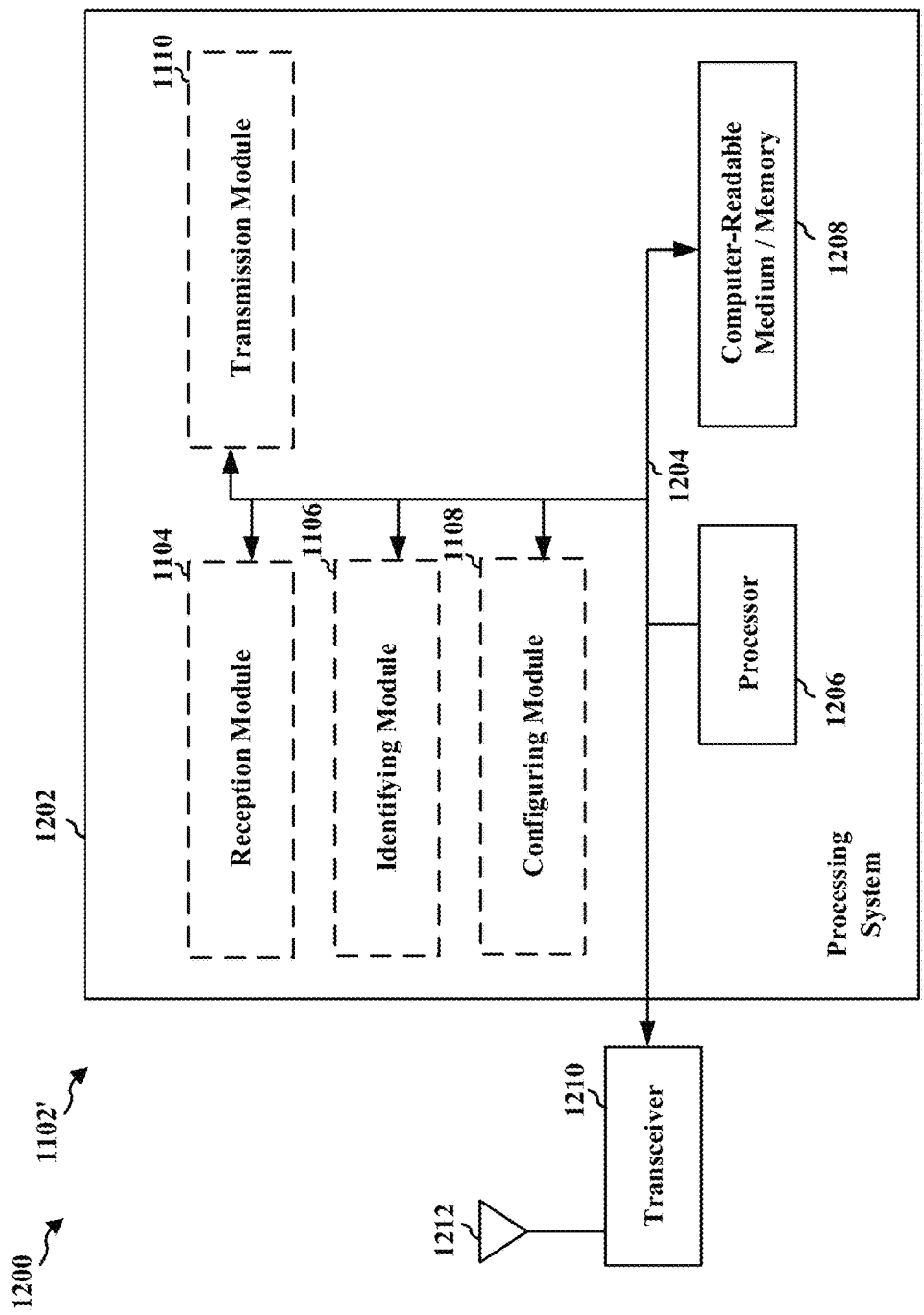
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be reception module 1104, identifying module 1106, configuring module 1108, and transmission module 1110.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and 1110, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, reception module 1104. In addition, the transceiver 1210 receives information from the processing system 1202, transmission module 1110, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, and 1110. The modules may be software modules running in the processor 1206, resident/stored in the computer readable medium/memory 1208, one or more hardware modules coupled to the processor 1206, or some combination thereof. The processing system 1202 may be a component of the eNB 610 and may include the memory 676 and/or at least one of the TX processor 616, the RX processor 670, and/or the controller/processor 675.

In some aspects, the apparatus 1102/1102' for wireless communication includes means for identifying a UE as a drone-mounted UE; and means for configuring one or more parameters associated with the UE based at least in part on identifying the UE as a drone-mounted UE. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX processor 616, the RX processor 670, and the controller/processor 675. As such, in one configuration, the aforementioned means may be the TX processor 616, the RX processor 670, and the controller/processor 675 configured to perform the functions recited by the aforementioned means.

Figure 13:
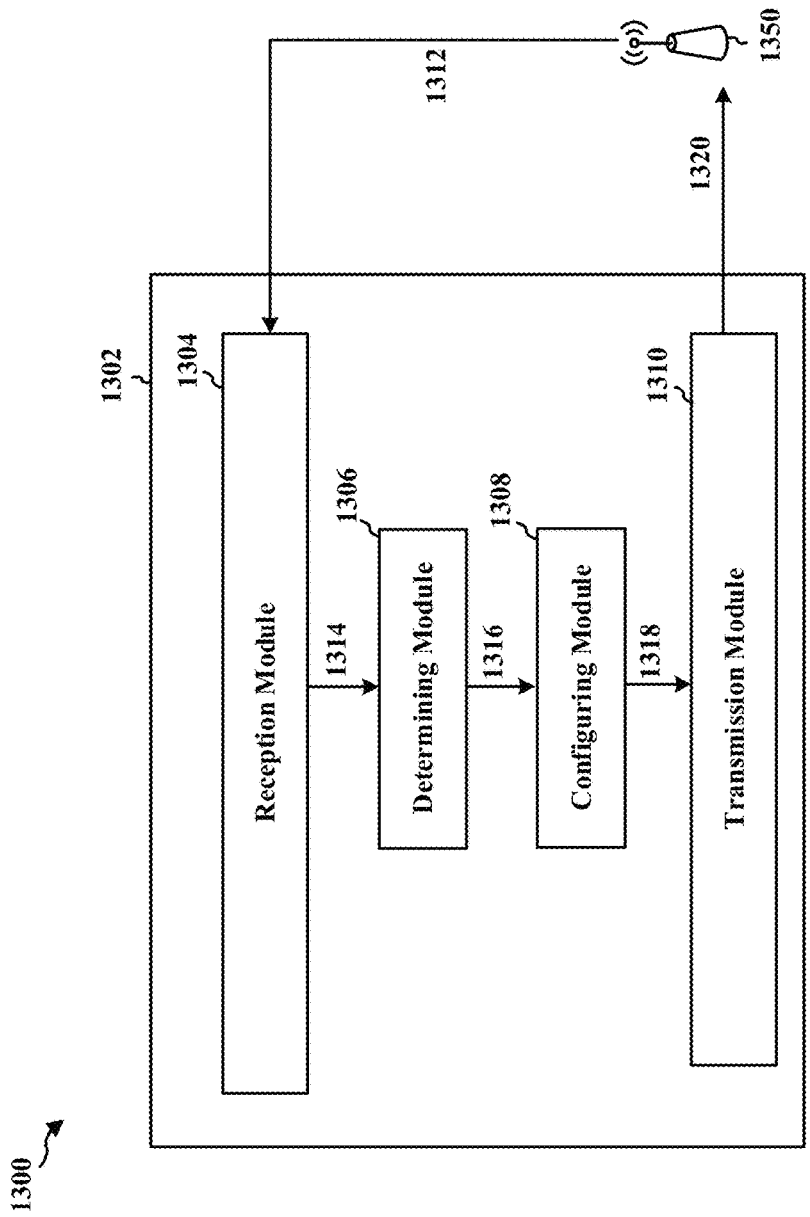
FIG. 13 is another conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a UE (e.g., the UE 102, 702, 802, and/or the like). In some aspects, the apparatus 1302 includes a reception module 1304, a determining module 1306, a configuring module 1308, and/or a transmission module 1310.

The reception module 1304 may receive signals 1312 from a base station 1350 (e.g., an eNB 106, 704, 804, 1102/1102', and/or the like). The signals 1312 may include downlink traffic, reference signals, and/or the like. The reception module 1304 may process the signals 1312 to determine data 1314, and may provide the data 1314 to the determining module 1306.

The determining module 1306 may determine, based at least in part on the signals 1312 and/or data 1314, that a threshold is satisfied with regard to an uplink throughput, a downlink throughput, a signal strength, or a signal quality associated with the apparatus 1302. The determining module 1306 may provide data 1316 to the configuring module 1308 indicating that the threshold is satisfied.

The configuring module 1308 may configure a transmission power parameter or a measurement reporting parameter based at least in part on the data 1316. In some aspects, the configuring module 1308 may cause configuration of another apparatus or component, such as one or more other components of the apparatus 1302 and/or the base station 1350. The configuring module 1308 may provide data 1318 that identifies the configuration to the transmission module 1310. The transmission module 1310 may transmit the data 1318 as signals 1320 to cause the base station 1350, or another apparatus or component, to be configured.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13.

Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
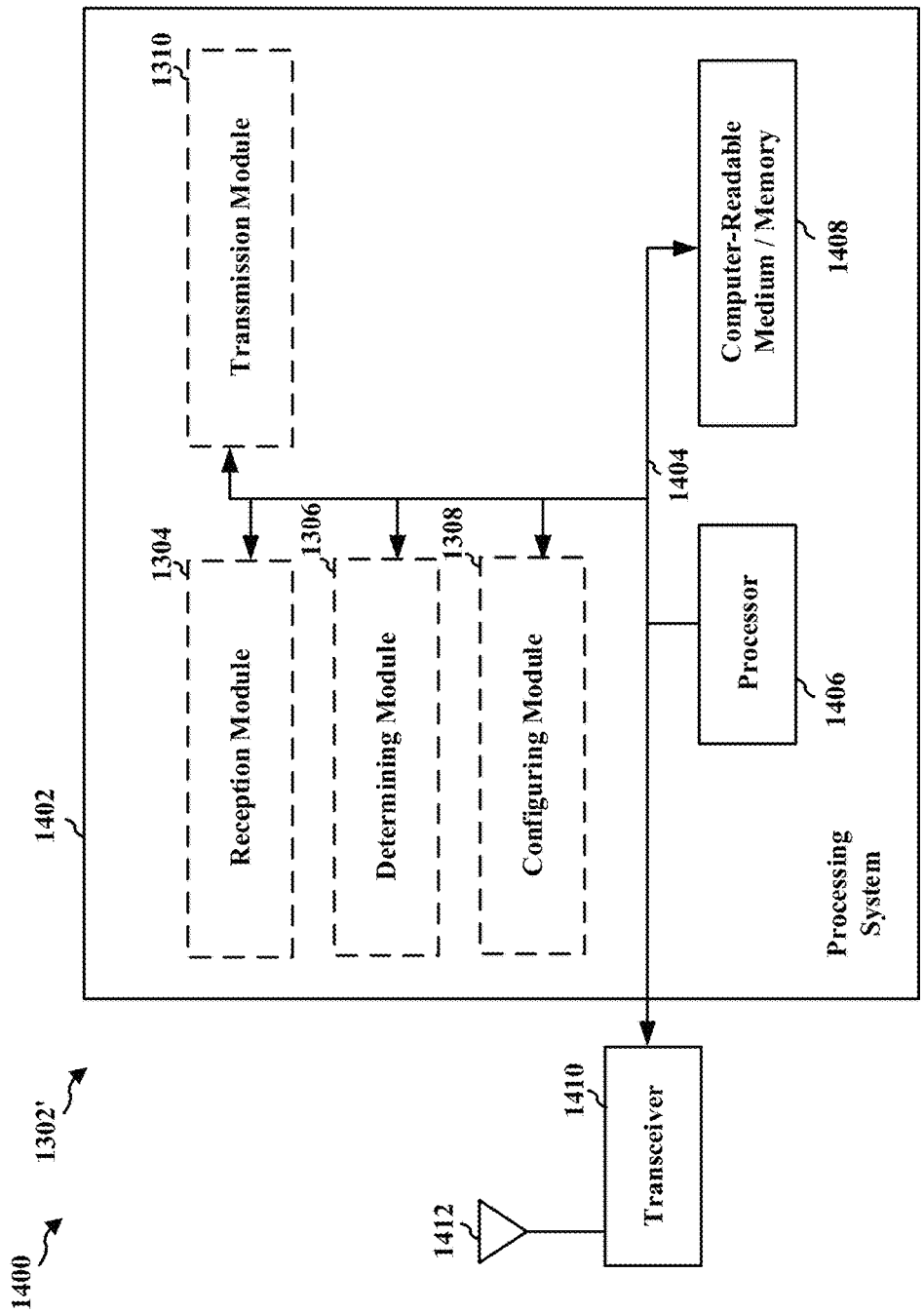
FIG. 14 is another diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be reception module 1304, determining module 1306, configuring module 1308, and transmission module 1310.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and 1310, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, reception module 1304. In addition, the transceiver 1410 receives information from the processing system 1402, transmission module 1310, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, 1308, and 1310. The modules may be software modules running in the processor 1406, resident/stored in the computer readable medium/memory 1408, one or more hardware modules coupled to the processor 1406, or some combination thereof. The processing system 1402 may be a component of the UE 650 and may include the memory 660 and/or at least one of the TX processor 668, the RX processor 656, and/or the controller/processor 659.

In some aspects, the apparatus 1302/1302' for wireless communication includes means for determining that a threshold is satisfied with regard to an uplink throughput, a downlink throughput, a signal strength, or a signal quality associated with the apparatus 1302/1302'; and means for configuring a transmission power parameter or a measurement reporting parameter based at least in part on determining that the threshold is satisfied. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX processor 668, the RX processor 656, and/or the controller/processor 659. As such, in one configuration, the aforementioned means may be the TX processor 668, the RX processor 656, and/or the controller/processor 659 configured to perform the functions recited by the aforementioned means.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   determining, by a user equipment (UE) mounted on a drone, that a threshold is satisfied with regard to an uplink throughput, a downlink throughput, a signal strength, or a signal quality associated with the UE;
   configuring, by the UE, a transmission power parameter or a measurement reporting parameter based at least in part on determining that the threshold is satisfied; and transmitting, by the UE and to a base station, a measurement report based on the transmission power parameter or the measurement reporting parameter, wherein the measurement report includes information identifying a quantity of cells reported within a threshold level of a serving cell of the UE, and wherein the UE is identified by the base station based at least in part on the quantity of cells.

2. The method of claim 1, wherein configuring the transmission power parameter or the measurement reporting parameter comprises configuring a maximum transmission power of the UE to less than a maximum allowable transmit power of the UE.

3. The method of claim 1, wherein configuring the transmission power parameter or the measurement reporting parameter comprises configuring the measurement report to be provided by the UE only when the signal strength or the signal quality satisfies the threshold.

4. The method of claim 1, further comprising:
providing, to the base station, one or more other measurement reports.

5. The method of claim 1, further comprising:
providing, to the base station, information that identifies a quantity of handovers per unit time.

6. The method of claim 1, further comprising:
providing, to the base station, information that identifies a signal to interference plus noise ratio (SINR) of one or more drone-mounted UEs.

7. The method of claim 1, further comprising:
collecting measurement information for cells covering the UE; and
reporting the measurement information to the base station.

8. The method of claim 7, wherein the measurement information is reported to the base station only when a strongest cell, of the cells, changes.

9. The method of claim 1, further comprising:
determining to transmit a particular quantity of measurement reports over a particular length of time; and
transmitting the particular quantity of measurement reports, wherein the particular quantity of measurement reports include the measurement report.

10. The method of claim 1, further comprising:
providing, to the base station, information identifying a signal quality variation based at least in part on network condition.

11. A user equipment (UE) mounted on a drone, comprising:
a memory; and
one or more processors, communicatively connected to the memory, configured to:
determine that a threshold is satisfied with regard to an uplink throughput, a downlink throughput, a signal strength, or a signal quality associated with the UE;
configure a transmission power parameter or a measurement reporting parameter based at least in part on determining that the threshold is satisfied; and
provide, to a base station, a measurement report based on the transmission power parameter or the measurement reporting parameter, wherein the measurement report includes information identifying a quantity of cells reported within a threshold level of a serving cell of the UE, and wherein the information identifying the quantity of cells is used by the base station to identify the UE.

12. The UE of claim 11, wherein configuring the transmission power parameter or the measurement reporting parameter comprises configuring a maximum transmission power of the UE to less than a maximum allowable transmit power of the UE.

13. The UE of claim 11, wherein configuring the transmission power parameter or the measurement reporting parameter comprises configuring the measurement report to be provided by the UE only when the signal strength or the signal quality satisfies the threshold.

14. The UE of claim 11, wherein the one or more processors are further configured to:
provide, to the base station, one or more other measurement reports.

15. The UE of claim 11, wherein the one or more processors are further configured to:
provide, to the base station, information that identifies a quantity of handovers per unit time.

16. The UE of claim 11, wherein the one or more processors are further configured to:
provide, to the base station, information that identifies a signal to interference plus noise ratio (SINR) of one or more drone-mounted UEs.

17. The UE of claim 11,
wherein the one or more processors are further configured to:
collect measurement information for cells covering the UE; and
report the measurement information to the base station, and
wherein the measurement information is reported to the base station only when a strongest cell, of the cells, changes.

18. The UE of claim 11, wherein the one or more processors are further configured to:
determine to transmit a particular quantity of measurement reports over a particular length of time; and
transmit the particular quantity of measurement reports, wherein the particular quantity of measurement reports include the measurement report.

19. The UE of claim 11, wherein the one or more processors are further configured to:
provide, to the base station, information identifying a reference signal received quality (RSRQ) metric.

20. A non-transitory computer-readable medium storing one or more instructions for wireless communication, the one or more instructions comprising:
one or more instructions that, when executed by one or more processors of a user equipment (UE) mounted on a drone, cause the one or more processors to:
determine that a threshold is satisfied with regard to an uplink throughput, a downlink throughput, a signal strength, or a signal quality associated with the UE;
configure a transmission power parameter or a measurement reporting parameter based at least in part on determining that the threshold is satisfied; and
transmit, to a base station, a measurement report based on the transmission power parameter or the measurement reporting parameter, wherein the measurement report includes information identifying a quantity of cells reported within a threshold level of a serving cell of the UE, and wherein the UE is identified by the base station based at least in part on the quantity of cells.

21. The non-transitory computer-readable medium of claim 20, wherein configuring the transmission power parameter or the measurement reporting parameter comprises configuring a maximum transmission power of the UE to less than a maximum allowable transmit power of the UE.

22. The non-transitory computer-readable medium of claim 20, wherein configuring the transmission power parameter or the measurement reporting parameter comprises configuring the measurement report to be provided by the UE only when the signal strength or the signal quality satisfies the threshold.

23. The non-transitory computer-readable medium of claim 20, wherein the one or more instructions, when executed by the one or more processors, further cause the one or more processors to:
provide, to the base station, one or more other measurement reports.

24. The non-transitory computer-readable medium of claim 20, wherein the threshold level is a threshold signal strength.

25. An apparatus for wireless communication, comprising:
means for determining that a threshold is satisfied with regard to an uplink throughput, a downlink throughput, a signal strength, or a signal quality associated with the apparatus; and
means for configuring a transmission power parameter or a measurement reporting parameter based at least in part on determining that the threshold is satisfied; and
means for transmitting, to a base station, a measurement report based on the transmission power parameter or the measurement reporting parameter, wherein the measurement report includes information identifying a quantity of cells reported within a threshold level of a serving cell of the apparatus, and wherein the apparatus is identified by the base station based at least in part on the quantity of cells.

26. The apparatus of claim 25, wherein configuring the transmission power parameter or the measurement reporting parameter comprises configuring a maximum transmission power of the apparatus to less than a maximum allowable transmit power of the apparatus.

27. The apparatus of claim 25, wherein configuring the transmission power parameter or the measurement reporting parameter comprises configuring the measurement report to be provided by the apparatus only when the signal strength or the signal quality satisfies the threshold.

28. The apparatus of claim 25, further comprising:
means for providing, to the base station, information that identifies a signal to interference plus noise ratio (SINK) of one or more drone-mounted UEs.

29. The apparatus of claim 25, further comprising:
means for collecting measurement information for cells covering the apparatus; and
means for reporting the measurement information to the base station,
wherein the measurement information is reported to the base station only when a strongest cell, of the cells, changes and
means for providing, to the base station, a pathloss of one or more cells that cover the apparatus.

* * * * *